United States Patent
Zhao et al.

(10) Patent No.: US 12,008,364 B1
(45) Date of Patent: Jun. 11, 2024

(54) INCONSISTENCY-BASED BUG DETECTION

(71) Applicant: Amazon Technologies, Inc., Seattle, WA (US)

(72) Inventors: Hangqi Zhao, Seattle, WA (US); Qiang Zhou, San Jose, CA (US); Sengamedu Hanumantha Rao Srinivasan, Seattle, WA (US)

(73) Assignee: Amazon Technologies Inc., Seattle, WA (US)

( * ) Notice: Subject to any disclaimer, the term of this patent is extended or adjusted under 35 U.S.C. 154(b) by 0 days.

(21) Appl. No.: 17/357,616

(22) Filed: Jun. 24, 2021

(51) Int. Cl.
*G06F 8/75* (2018.01)
*G06F 8/10* (2018.01)
*G06F 40/30* (2020.01)

(52) U.S. Cl.
CPC .............. *G06F 8/75* (2013.01); *G06F 8/10* (2013.01); *G06F 40/30* (2020.01)

(58) Field of Classification Search
CPC ... G06F 8/75; G06F 40/30; G06F 8/10; G06F 11/36
See application file for complete search history.

(56) References Cited

U.S. PATENT DOCUMENTS

| | | | | |
|---|---|---|---|---|
| 7,185,330 B1* | 2/2007 | Khu | ...................... | G06F 8/4434 717/160 |
| 8,356,278 B2* | 1/2013 | Drissi | ...................... | G06F 8/36 717/102 |
| 8,359,326 B1* | 1/2013 | Garg | ...................... | G06F 16/951 707/765 |
| 2002/0023257 A1* | 2/2002 | Charisius | ...................... | G06F 8/20 717/106 |
| 2012/0278658 A1* | 11/2012 | Han | ...................... | G06F 11/3636 714/38.1 |
| 2013/0239219 A1* | 9/2013 | Siman | ...................... | G06F 21/577 726/25 |
| 2017/0212829 A1* | 7/2017 | Bales | ...................... | G06F 11/3604 |
| 2021/0103514 A1* | 4/2021 | Das | ...................... | G06F 11/3688 |

OTHER PUBLICATIONS

Ratinder Kaur et al., "Hybrid Real-time Zero-day Malware Analysis and Reporting System", [Online], pp. 63-73, [Retrieved from Internet on Aug. 11, 2021], <https://www.mecs-press.net/ijitcs/ijitcs-v8-n4/IJITCS-V8-N4-8.pdf> (Year: 2016).*
Steve Hanov, "Static Analysis of Binary Executables", [Online], pp. 1-9, [Retrieved from Interent on Aug. 11, 2022], <http://stevehanov.ca/cs842_project.pdf> (Year: 2009).*

(Continued)

*Primary Examiner* — Ziaul A Chowdhury
(74) *Attorney, Agent, or Firm* — Davis Wright Tremaine LLP

(57) ABSTRACT

A system identifies a pattern in source code. The pattern is identified based, at least in part, on correlation between units of code, or on the derivation of a rule from a recurring sequence in the source code. The system identifies a portion of the source code that at least partially matches the pattern, and determines that this portion includes at least one deviation from the pattern. The system then generates an error message to describe the deviation.

20 Claims, 10 Drawing Sheets

(56) References Cited

OTHER PUBLICATIONS

Abdulrahman Alatawi et al., "The Expansion of Source Code Abbreviations Using a Language Model", [Online], pp. 370-375, [Retrieved from Internet on Aug. 11, 2022], <https://ieeexplore.ieee.org/stamp/stamp.jsp?arnumber=8377888>, (Year: 2018).*

Abdulrahman Alatawi et al., "A Bigram-based Inference Model for Retrieving Abbreviated Phrases in Source Code", [Online], pp. 1-10, [Retrieved from Internt on Aug. 11, 2022], <https://dl.acm.org/doi/pdf/10.1145/3383219.3383221>, (Year: 2020).*

Adalbert Gerald Soosai Raj et al., "What Do Students Feel About Learning Programming Using Both English And Their Native Language?", [Online], pp. 1-8, [Retrieved from Internet on May 10, 2023], <https://ieeexplore.ieee.org/stamp/stamp.jsp?arnumber=8064423> (Year: 2017).*

Yusni Amaliah et al., "Auto Clustering Source Code To Detect Plagiarism Of Student Programming Assignments in Java Programming Language", [Online], pp. 1-6, [Retrieved from Internet on Feb. 10, 2024], <https://ieeexplore.ieee.org/stamp/stamp.jsp?arnumber=9649465>, (Year: 2021).*

Pegah Hozhabrierdi et al., "Python Source Code De-Anonymization Using Nested Bigrams", [Online], pp. 23-28, [Retrieved from Internet on Feb. 10, 2024], <https://ieeexplore.ieee.org/stamp/stamp.jsp?arnumber=8637444>, (Year: 2018).*

\* cited by examiner

INCONSISTENCY-BASED BUG DETECTION

BACKGROUND

A variety of techniques exist for detecting software defects. Although many of these tools are highly capable, they are generally best-suited for finding the most common categories of defects. As such, there remains a considerable need for tools and techniques that are better suited for finding software bugs that do not necessarily conform to common classes of defects.

BRIEF DESCRIPTION OF THE DRAWINGS

Various techniques will be described with reference to the drawings, in which.

DETAILED DESCRIPTION

In an example, a system for analyzing source code is adapted to find potential software defects based on local patterns. Here, a local patterns refers to characteristics of the particular source code being analyzed. The source code can be for a program or subsystem, in order to allow for patterns local to that collection of code to be analyzed independently. The characteristics can include patterns such as functions or procedures that are typically invoked at the beginning or end of other functions, parameters that are typically passed together to certain functions, and so on. These characteristics can reflect properties of the program or subsystem, the best practices of the programmers working on the source code, usage patterns of the application programming interfaces being used, and so on. To illustrate, programmers sometimes use logging functions to generate a record of a program's activities. Invocations of such functions typically occur in the same locations, such as at the beginning and end of other functions, and typically contain similar sets of parameters, such as a process id, line number, and so forth. Deviations from these typical patterns may indicate that the programmer has made an error.

In the example system, these errors may be detected using one of a variety of techniques. These include bigram-based analysis, sometimes referred to as a pointwise mutual information ("PMI") approach, and a sequence-based approach that considers longer sequences. The example system identifies a pattern in a collection of source code, using at least one of these two approaches. One of these is to count recurrences of a bigram, and determine that the bigram represents an expected pattern based on the frequency with which the bigram reoccurs in the source code. The other approach, based on longer sequences, is to identify recurring sequences in the source code and derive a rule from a commonly recurring sequence. This pattern corresponds to the rule. Once the pattern has been identified using one or both of these techniques, the system determines that a portion of the source code matches at least a portion of this pattern, but deviates in some way. This partial conformance and deviation is treated, by the system, as an indication that the corresponding portion of source code may contain an error. The system therefore generates an error message to indicate where in the source code the suspected error is located.

Figure 1:
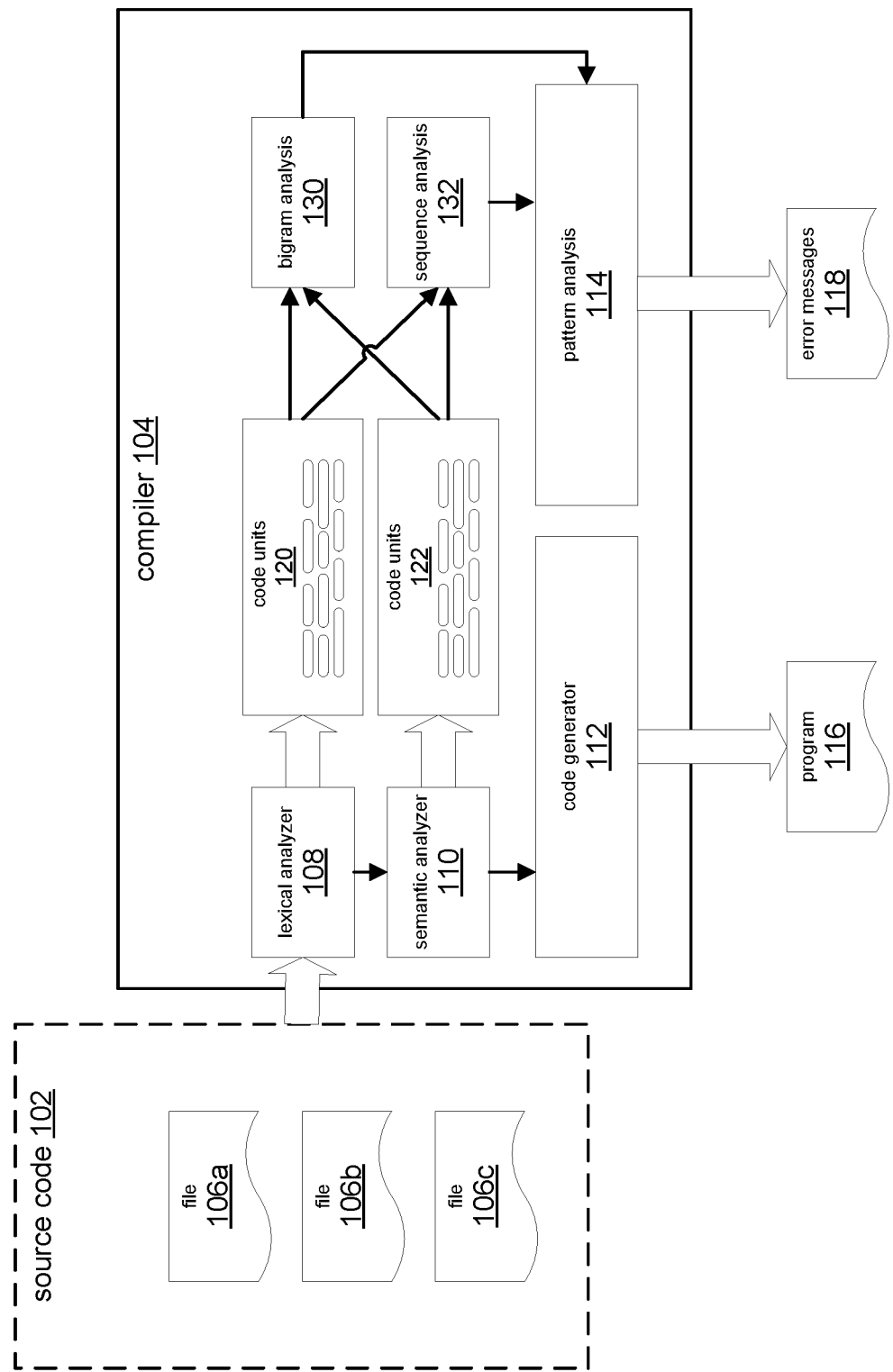
FIG. 1 illustrates an example of a compiler that performs local pattern analysis to find program errors, in accordance with at least one embodiment.

FIG. 1 illustrates an example of a compiler that performs local pattern analysis to find program errors, in accordance with at least one embodiment. The example compiler may execute on a system comprising one or more processors and a memory storing instructions that, in response to execution by the one or more processors, cause the system to implement embodiments of the techniques described herein. These techniques, in embodiments, comprise the identification of portions of source code that may contain errors and the generation of error messages to indicate the location of those potential errors.

Note that although the example 100 of FIG. 1 is described in relation to a compiler 104, embodiments may include a wide variety of systems and services. For example, at least one embodiment comprises one or more services that provide standalone code-analysis capabilities. It will be appreciated that the examples of a compiler and a standalone code-analysis service are intended to be illustrative, rather than limiting.

In at least one embodiment, the compiler 104 comprises analysis components which identify a pattern in source code 102, and also identify portions of the source code 102 that at least partially match the pattern. The compiler further identifies a deviation from the pattern in the source code, and generates an error message to describe the deviation.

The source code 102 comprises, in at least one embodiment, one or more files 106a-c that contain the programming language data, where programming language data refers, typically, to text-based input to a programming langue compiler or interpreter. The term compiler is used throughout to refer to a compiler, interpreter, or other program capable of translating source coded 102 into one or more stages of compiler output. Note that although a compiler is used throughout the present application as an illustrative example, embodiments may take a number of different forms, such as a standalone service for analyzing source code, an integrated development environment, and so on.

The compiler 104 comprises a lexical analyzer 108, semantic analyzer 110, and code generator 112. These components of the compiler 104 may be described as compiler stages. Output of these compiler stages, as well as the output of other stages not explicitly depicted, may include code units 120. In general, a code unit corresponds to some element of the source code 102 at some level of abstraction. For example, the output of the lexical analyzer 108 may comprise code units 120 that correspond to tokens or other lexical units of the source code 102. Likewise, the output of the semantic analyzer 110 may comprise code units 122 that correspond to expressions or other semantic units of the source code 102.

In at least one embodiment, the lexical analyzer 108 scans source code 102 and translates the text-based representation of code into tokens. A token may represent syntactic unit in the programming language that the source code 102 is written in, and usually represents the lowest level of syntactic unit, such as a keyword, operator, or identifier. In the depicted example 100, the lexical analyzer 108 generates code units 120 that comprise tokens in the programming language of the source code 102.

In at least one embodiment, the semantic analyzer 110 transforms the tokens generated by the lexical analyzer 108 into higher-level elements such as expressions or statements in the programming language of the source code 102. In some embodiments, the code units 122 generated by the semantic analyzer 110 may comprise abstract syntax trees. For example, the semantic analyzer 110 might translate a sequence of tokens into an abstract syntax tree that represents semantic constructs in a programming language. Examples of such semantic constructs include programming language statement, such as the invocation of a function, the computation of a mathematical value, or a conditional logic expression.

In at least one embodiment, the code generator 112 takes input from earlier stages of the compiler 104 and generates a program 116 as output. In some cases and embodiments, output of the code generator 112 can be used by the bigram analysis 130 and sequence analysis 132 components in the same or a similar way as the depicted code units 120, 122 that are output from the lexical and semantic analyzers, respectively.

In at least one embodiment, the code units 120, 122 are generated by a stage of the compiler 104, and represent a portion of the source code 102 at some level of abstractions, including but not limited to the token generated by lexical analyzer 108 and abstract syntax trees, (or nodes and/or edges of an abstract syntax tree) generated by semantic analyzer 110.

In at least one embodiment, a bigram analysis component 130 identifies patterns in the source code 102 based, at least partially, on the frequency of a bigram in the source code 102. Here, frequency can refer simply to the total number of bigrams, or to some other measure, such as occurrences per line of code. Examples of this form of analysis are provided throughout the present disclosure, including but not limited to the embodiments described in relation to FIGS. 2-4.

In at least one embodiment, a sequence analysis component 132 identifies patterns in the source code 102 based, at least partially, on recurring sequences of code units 120, 122 and on rules derived from these recurring sequences. Examples of this form of analysis are provided throughout the present disclosure, including but not limited to the embodiments described in relation to FIGS. 5 and 6.

In at least one embodiment, a pattern analysis component 114 identifies a portion of source code 102 that at least partially conform to a pattern identified by the bigram analysis 130 or sequence analysis 132, but contains at least one deviation from the identified pattern. This deviation may be indicative of an error in the source code. Accordingly, if such a deviation is identified, the pattern analysis component 114 generates a message or other indication of the deviation and the location of the deviation in the source code 102. This information may then be used to correct a defect in the source code 102.

Figure 2:
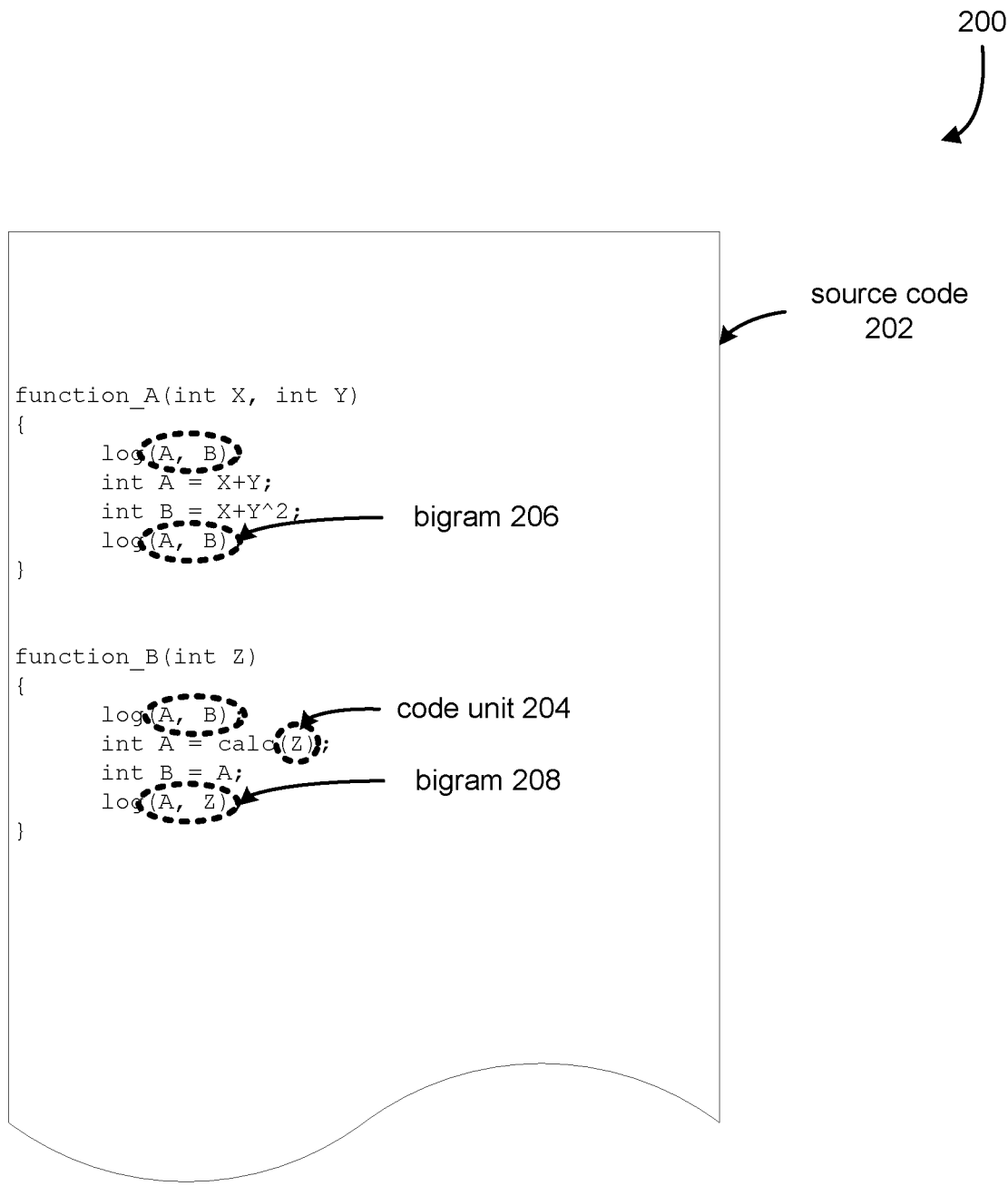
FIG. 2 illustrates an example of token bigrams in source code, in accordance with at least one embodiment.

FIG. 2 illustrates an example of bigrams in source code, in accordance with at least one embodiment. In the depicted example 200, source code 202 comprises various functions, each of which contains various programming language statements, such as functions invocations and assignment expressions. Bigrams may be used in PMI-based analysis to find common patterns in the source code, and these patterns may then be used to find potential errors where the source code only partially conforms to an identified pattern.

The source code 202 may be processed by a lexical analyzer, such as the lexical analyzer 108 depicted in FIG. 1, to obtain code units that correspond to tokens. For example, a code unit 204 might correspond to the identifier "Z." Other examples of code units in this example could include, but are not limited to, "log", "int", or "X", to list several of many possible examples. These occur in sequences throughout the source code 202, such as the sequence "log"+"("+"A" +","+"B"+")". Embodiments might filter this sequence for the purpose of bigram analysis, for example to "log"+"A"+"B".

In at least one embodiment, a bigram comprises a pair of code units. For example, the sequential tokens "log" and "A" might form the bigram ["log", "A" ], and the sequential (after filtering) tokens "A" and "B" might form the bigram ["A", "B" ].

The source code 202 may contain certain bigrams which repeat with some frequency. For example, in source code 202 the bigram ["log", "A" ] is repeated four times, and the bigram ["A", "B" ] 206 is repeated tree times. The frequency of a particular bigram in the source code can be an indication of a pattern, and in particular can indicate that there is a correlation between the units of code in the bigram. In this example, the frequent occurrence of the bigram ["A", "B" ] might be seen as indicating a correlation between the code unit "A" and the code unit "B". In at least one embodiment, if this frequency is above a threshold level, the compiler may determine that a frequently occurring bigram is indicative of a pattern. The compiler may also determine that portions of code at least partially match this pattern, but deviate in some way. For example, in FIG. 2 the bigram ["A", "Z" ] 208 partially conforms to the pattern of "A", "B" implied by the frequent occurrence of the bigram ["A", "B" ]. This is because both bigrams begin with "A". However, ["A", "Z" ] deviates from this pattern in that its second code unit is a "Z" instead of a "B". The system, having identified this deviation, may then determine to generate an error message indicating that the source code may contain an error. The message might, for example, contain information specifying the location of the bigram ["A", "Z" ] and textual information describing the pattern that the bigram ["A", "Z" ] appears to deviate from.

In at least one embodiment, a pattern is located based on correspondence successive bigrams. For example, regarding FIG. 2, the bigrams ["log", "A" ] and ["A", "B" ] might be indicative of a pattern in which "log" is typically followed by "A", and a pattern in which "A" is typically followed by "B". Embodiments may identify deviations from these patterns individually, but might also identify deviations in view of context provided by a preceding bigram. For example, the source code 202 might contain several instances of the bigram ["A", "X" ], which deviates from the pattern "A" followed by "B". However, the system might treat this deviation as more significant if it follows a bigram which conforms to a pattern, such as "log" followed by "A". This can be accomplished, for example, by weighting deviations according to preceding bigrams which conform to a pattern, and highlighting (or only generating error messages for) deviations above a certain weight.

Figure 3:
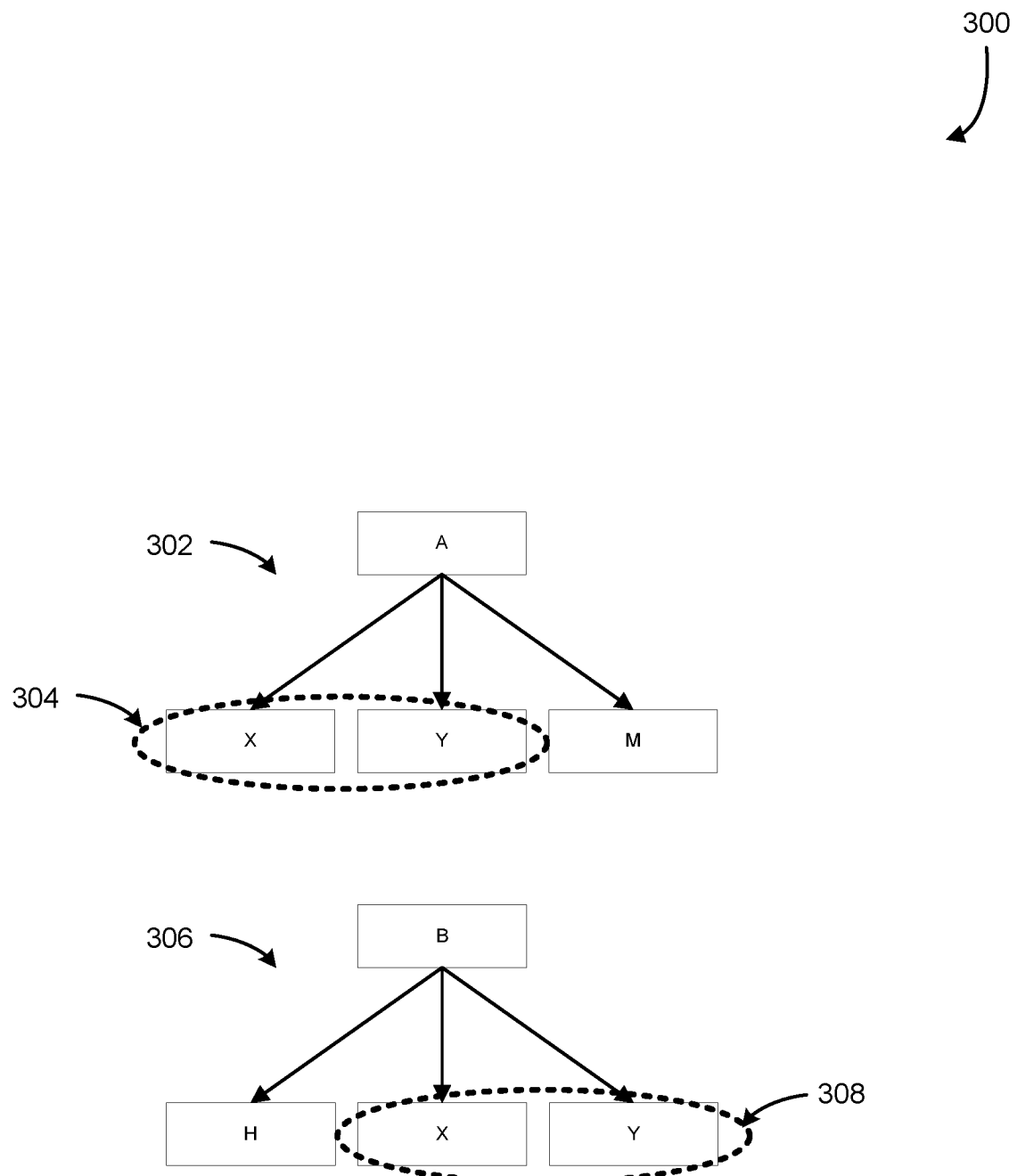
FIG. 3 illustrates an example of bigrams based on semantic elements of source code, in accordance with at least one embodiment.

Note that FIG. 2 depicts an example of bigram analysis that is based on a token-level view of code. However, embodiments may perform bigram analysis on a number of levels, based for example on various output stages of the compiler. FIG. 3 illustrates an example bigram analysis based on semantic elements of source code, in accordance with at least one embodiment. As described in relation to the semantic analyzer component 110 of FIG. 1, semantic elements include programmer language elements such as expressions, statements, and so forth. More generally, semantic elements can include any language construct at a higher level than a token. In at least one embodiment, a semantic element is represented in computer memory as a tree or tree-like structure, or as a graph. These may sometimes be referred to as abstract syntax trees ("ASTs").

FIG. 3 depicts a tree 302 representing a function "A" which comprises invocations of additional functions "X", "Y", and "M", in that sequence. Similarly, another tree 306 might represent a function "B" which comprises invocations of functions "H", "X", and "Y", in that sequence. Accordingly, analysis of these trees may indicate a pattern, namely that an invocation of "X" is typically followed by an invocation of "Y". Similar to the bigram analysis described in relation to FIG. 5, the system may identify this pattern by counting the frequency of bigrams in depicted trees.

| bigram | frequency |
| --- | --- |
| ["X", "Y"] | 2 |
| ["Y", "M"] | 1 |
| ["H", "X"] | 1 |

As seen in the table above, the bigram ["X", "Y"] appears with greater frequency than the other bigrams in the example. Although this example only depicts two such occurrences, it in typical, practical applications there may be certain bigrams that appear with considerably greater frequency than other bigrams. Accordingly, patterns at the semantic level of the program can be discovered by analyzing bigrams at the semantic level of compiler output.

Figure 4:
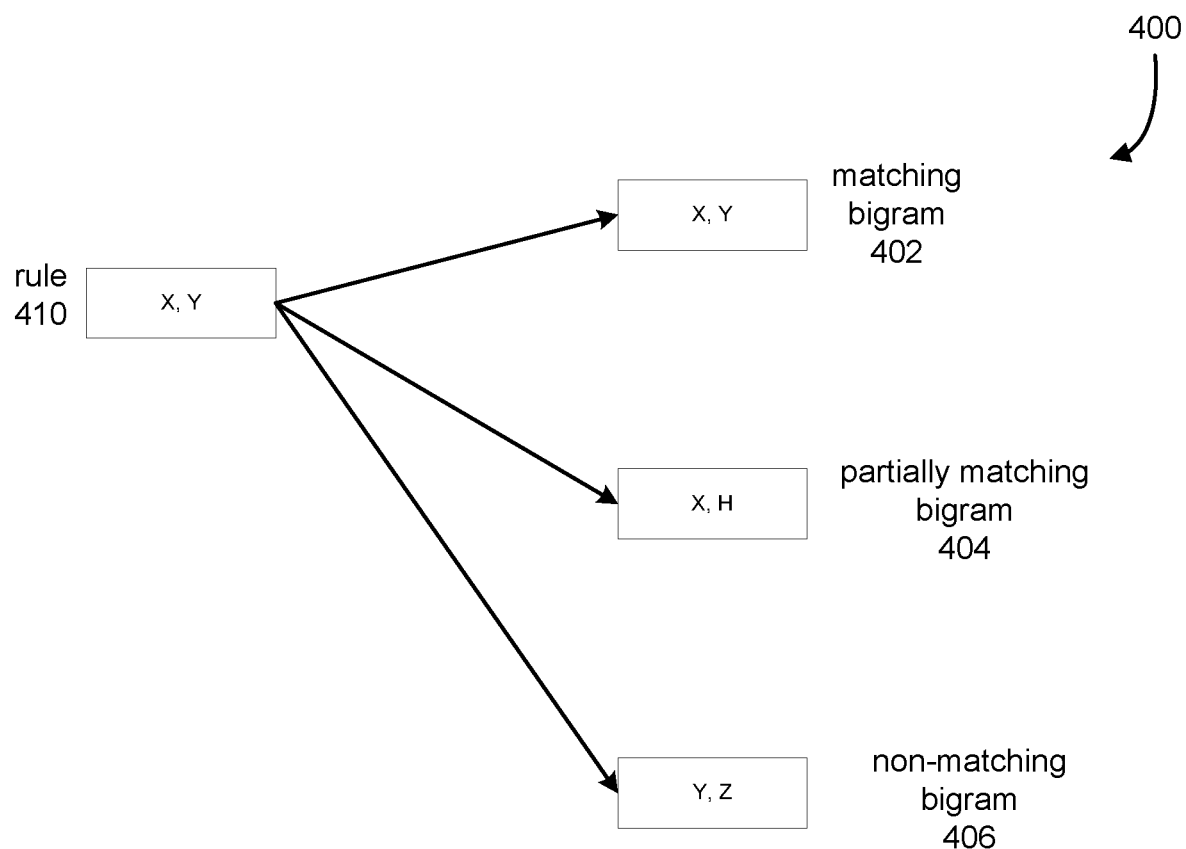
FIG. 4 illustrates full and partial bigram matching, in accordance with at least one embodiment.

FIG. 4 illustrates full and partial bigram matching, in accordance with at least one embodiment. In at least one embodiment, a compiler or other such system identifies errors in source code by identifying bigrams that partially match a bigram identified as a pattern. For example, bigram analysis at the token or semantic level might result in identification of a frequent bigram ["X", "Y"], which based its frequency in the source code might then be determined to represent a pattern. The system might then search for other bigrams, at the appropriate level of analysis for bigrams which at least partially match the pattern. A matching bigram 402 would have been counted during frequency analysis, and although its location might be noted as a reference point and subsequently provided to the user as an example of the observed pattern, it would not be considered a potential error. Likewise, a non-matching bigram 406 would not be considered a potential error. Since it doesn't conform even partially to the observed pattern, it is likely not relevant to the pattern. On the other hand, a partially matching bigram 404 may be considered as a potential error location. For example, since the system has concluded that "X" is usually followed by "Y", the fact that "X" is followed by "H" rather than "Y" in the partially bigram 404 may be an indication of an error. The system may therefore generate an error message to indicate this. However, in some embodiments, further analysis may be applied to reduce the number of false positives. This additional analysis can include analysis of the sequence of bigrams in which the partially matching bigram 404 occurs, or other forms of sequence-based analysis.

Figure 5:
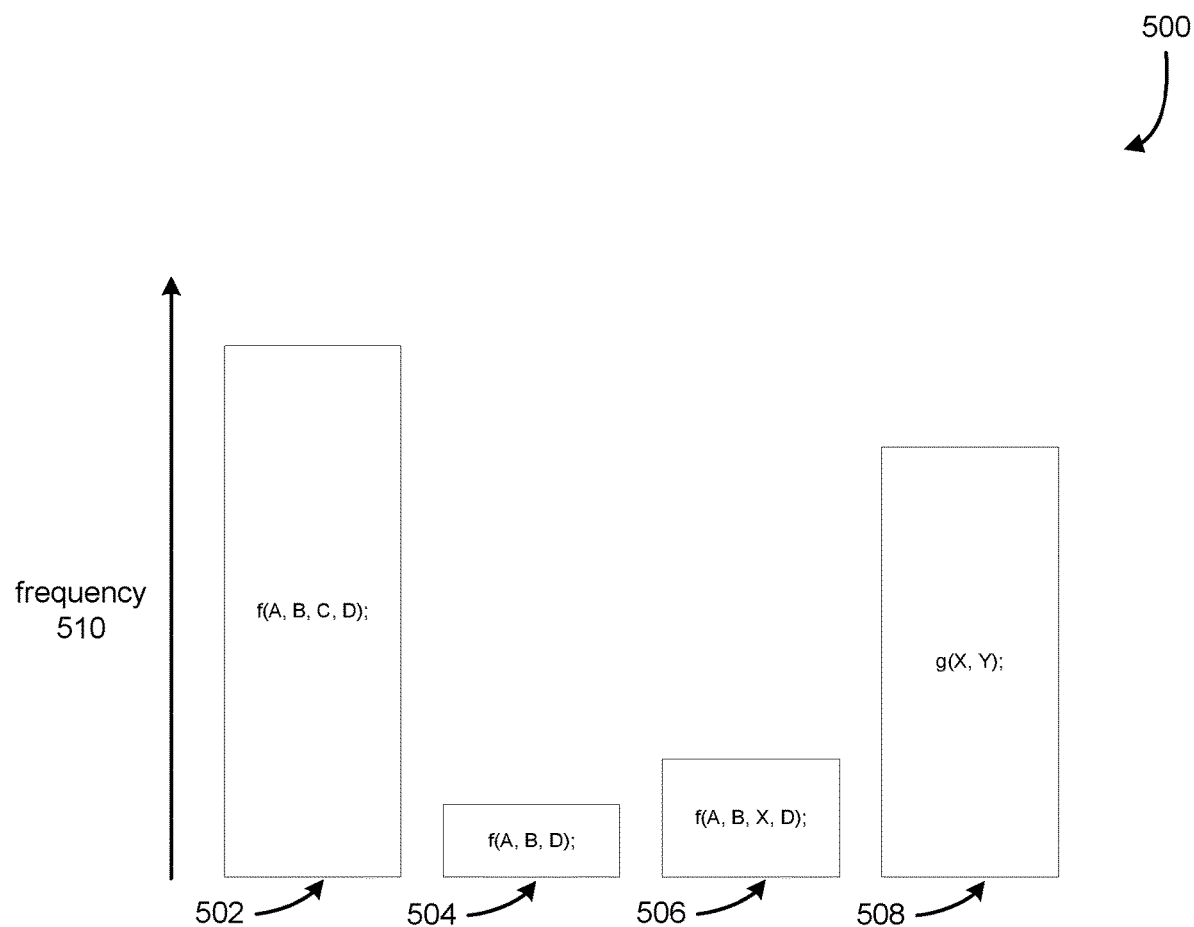
FIG. 5 illustrates sequence-based frequency analysis, in accordance with at least one embodiment.

Sequence-based analysis may be used in addition to or instead of bigram-based analysis to identify patterns in source code and deviations in those patterns which might represent potential errors. FIG. 5 illustrates sequence-based frequency analysis, in accordance with at least one embodiment.

In at least one embodiment, sequence-based analysis includes a series of steps which can include performing program analysis to exact analyzable elements of the code, such as expressions and statements. These elements can, in some cases, correspond to semantic elements of the relevant programming language. Next, the analysis assigns these elements to baskets and derives rules based on the counts, and other information, associated with the respective baskets.

For example, as depicted in FIG. 5, various baskets 502-508 may be associated with program elements that correspond to function invocations. One of these baskets 502 may be associated with a common invocation "f(A, B, C, D)", while others 504, 506 might be associated with the less-common invocations "f(A, B, D)" and "f(A, B, X, D)". The more frequent baskets, such as the baskets 502, 508 representing "f(A, B, C, D)" and "g(X, Y)", can be the basis of rules generated by the system. These rules can then be applied to the code base, and used to identify potential defects. In at least one embodiment, these rules are identified using techniques sometimes referred to as frequent itemset mining, association rule learning, and sequential pattern mining. In general terms, these approaches involve the use of the frequency distribution of sequences in the source code to derive a rule.

Figure 6:
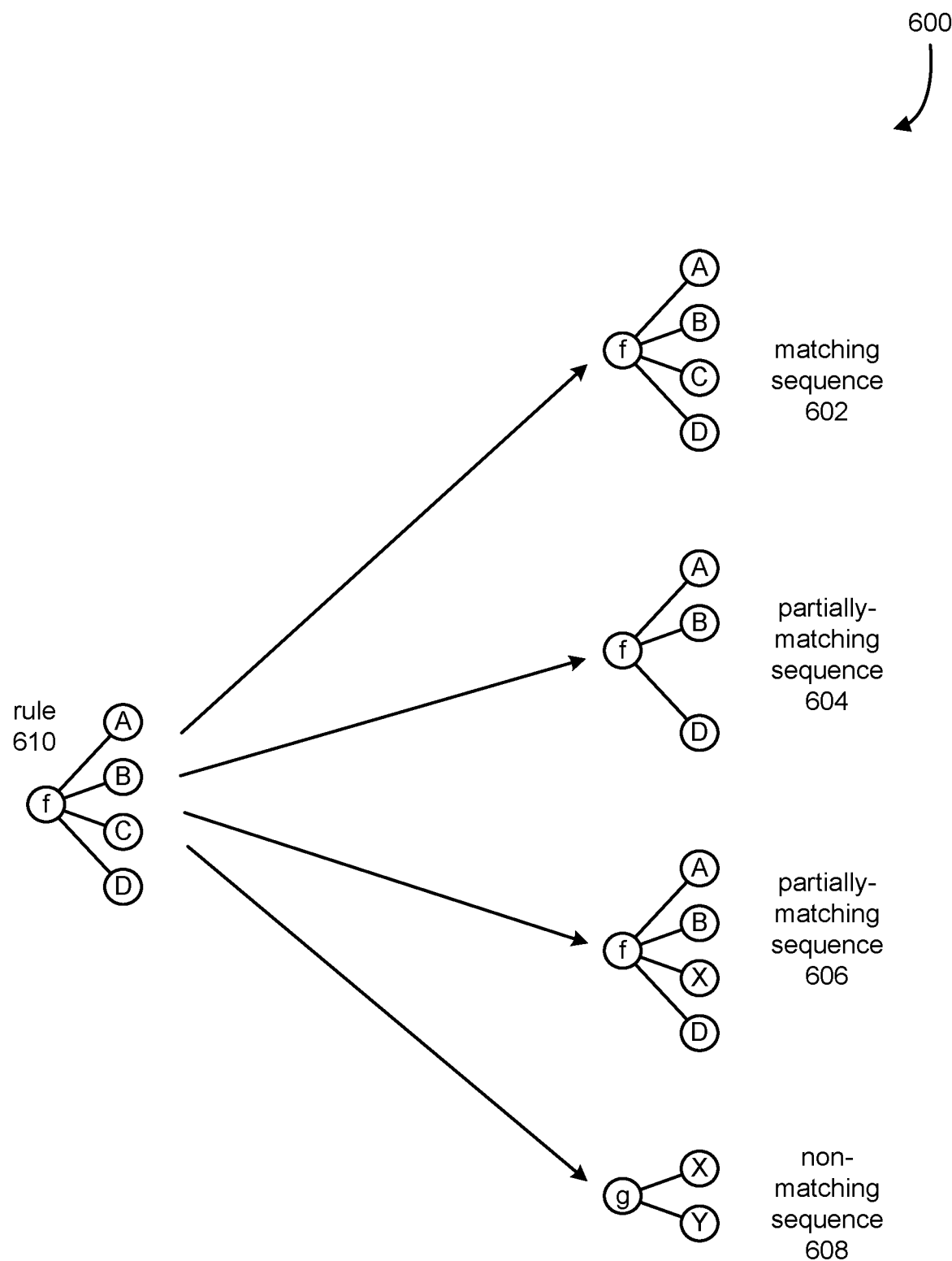
FIG. 6 illustrates full and partial sequence matching, in accordance with at least one embodiment.

Once a rule is derived, the system may attempt to perform sequence alignment in order to identify potential errors. Similar to analysis using bigrams, the sequence alignment involves identifying full and partial mappings between the sequence described by the rule and the sequences in the source code. FIG. 6 illustrates full and partial sequence matching, in accordance with at least one embodiment.

As depicted in FIG. 6, a rule 610 may comprise information describing an expected sequence of code. In embodiments, the sequence may be a list, graph, or model of an expected sequence. The rule may require exact, inexact, or fuzzy matches between the sequence described by the rule and the sequence the rule is being applied to. For clarity, FIG. 6 describes a system that attempts to identify exact matches, but it should be appreciated that other matching techniques may be used.

The rule 610 might be compared to a sequence 602 that is determined to match, or conform to, the rule 610. As just noted, this conformance might correspond to an exact match. For example, as depicted in FIG. 6, the rule 610 might indicate that the function "f" should be invoked as f(A, B, C, D). The matching sequence 602 might conform exactly to this pattern, and represent an invocation of the function "f" that also takes the form of f(A, B, C, D). The sequence 602 would then be said to conform to the rule 610, and not be flagged as a potential source of an error. The sequence 608 would also not be considered as a potential error location with respect to the rule 610, since it represents an entirely different sequence, g(X, Y).

On the other hand, the sequences 604, 606 representing f(A, B, D) and f(A, B, X, D) partially conform to the rule 610, and might therefore be considered as a potential error location. Both may therefore be flagged as errors. However, in some embodiments, these partially matching sequences 604, 606 might be ranked according to how closely they conform to the rule. In at least one embodiment, the sequence 606 could be ranked differently than the sequence 604, based on the system determining that the sequence f(A, B, X, D) conforms to the rule f(A, B, C, D), but still contains a deviation. In some cases, missing portions of a pattern may indicate a more significant deviation, while in other cases, substituted portions of a pattern are more significant. In some cases, the system may assume that the more significant the deviation is, the more likely it is that the deviation was intentional rather than unintentional.

Figure 7:
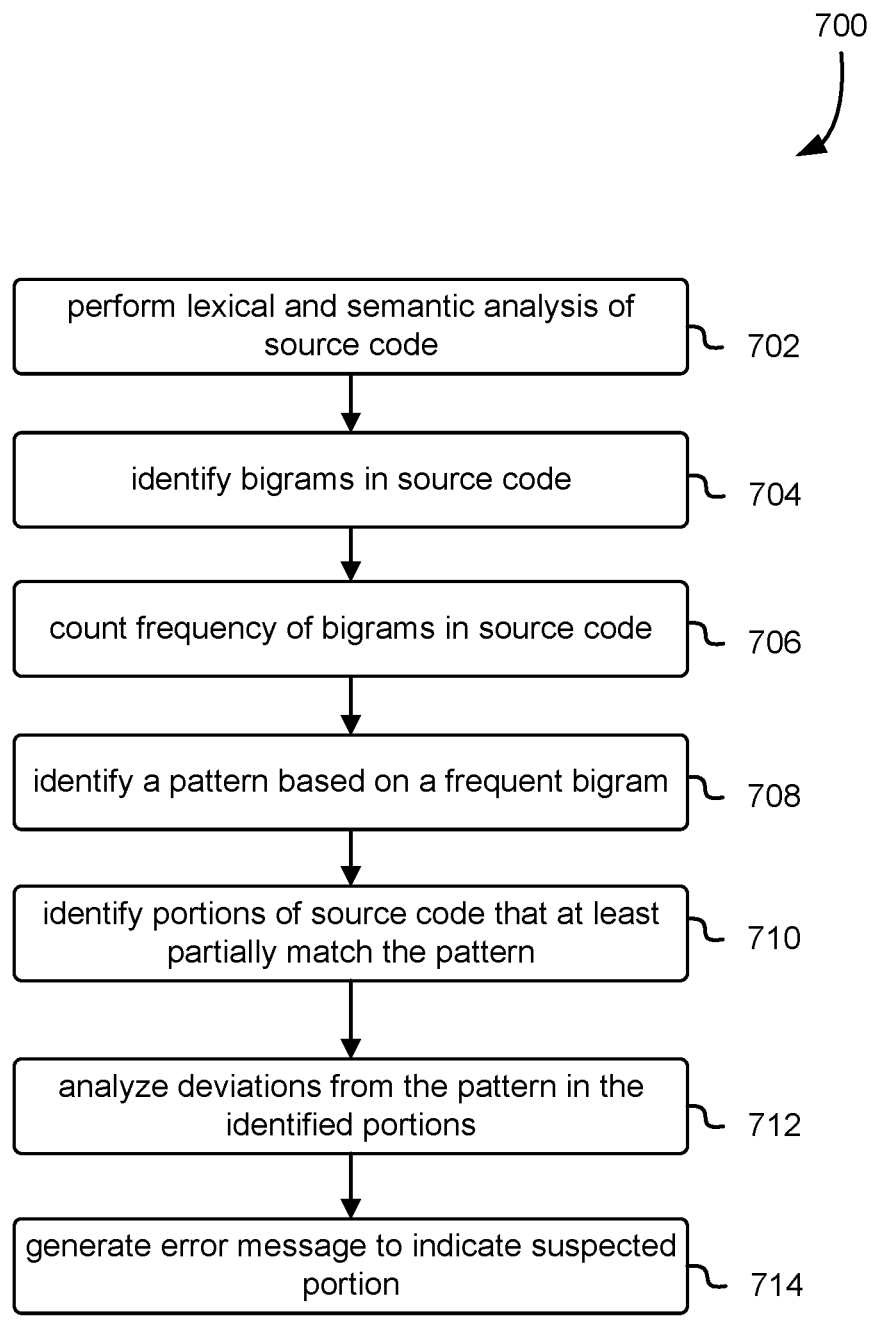
FIG. 7 illustrates an example process of identifying program errors using bigram analysis, in accordance with at least one embodiment.

FIG. 7 illustrates an example process of identifying program errors using bigram analysis, in accordance with at least one embodiment. Although the example process 700 is depicted as a sequence of steps or operations, it will be appreciated that the depicted order is intended to be illustrative rather than limiting. In various embodiments, the depicted steps or operations may be altered, omitted, or reordered, except where explicitly indicated or logically required, such as when the input of a step or operation is dependent upon the output of a prior step or operation. Embodiments of the example process may be implemented by any suitable system, such as a computing device or hosted computing service. In addition, although the steps below are described as being implemented by a compiler, it will be appreciated that a compiler is but one of many possible embodiments, and that the description of example process 700 using a compiler embodiment is intended to be illustrative, rather than limiting.

At 702, the compiler performs lexical and semantic analysis of a collection of source code. The source code may comprise one or more files that are to be compiled to form a software program or library. Note that in some cases, the steps or operations described in relation to FIG. 7 may be performed on a subset of the files, such as those files related to a particular subsystem within an application. The compiler may therefore provide support for various configuration or execution options to allow a user to specify which source code should be considered related for the purpose of identifying patterns. This may be useful, for example, when different subsystems are maintained by different teams and, consequently, reflect different patterns and practices.

Examples of the lexical and semantic analysis performed at 702 are described herein, such as in relation to the lexical analyzer and semantic analyzer depicted in FIG. 1. In general, these and other stages of a compiler are used, in various embodiments, to generate the code units that are to then be subjected to bigram and sequence analysis.

At 704, the compiler identifies bigrams in the source code. In at least one embodiment, the compiler scans code units output from a compiler stage and stores a record of the bigram and a count of how many times that particular bigram has been observed in the source code. Examples of bigram analysis are included herein, such as in relation to FIGS. 2-4.

At 706, the compiler counts the frequency of the various bigrams in the source code. Note that bigrams are described as being in source code, even though they may be identified based on the output of various compiler output stages, such as lexical or semantic analysis. The compiler will generally be able to link the output of these stages to a particular location in the source code.

In at least one embodiment, a record of a bigram is stored when the bigram is first encountered, and a counter in the record is incremented each subsequent time the same bigram is seen. This may continue as the compiler examines input from a compiler stage, until all appropriate code within the relevant codebase has been considered. When this completes, the compiler will have obtained the relevant counts, and can begin making judgements regarding patterns in the source code.

At 708, the compiler identifies a pattern in the source code, based on bigrams identified as being frequent. In at least one embodiment, bigrams determined to have a frequency that is above a threshold level are considered to be patterns, or are treated as candidate patterns and further evaluated. Frequency may refer to the total number of occurrences of the bigram, or to some other measure such as the number of occurrences per line of code. Other factors in addition to or instead of frequency may be considered, such as the types of the code units in a bigram, the relationship between the bigram and its preceding or subsequent bigram, and so forth. In at least one embodiment, the context in which a bigram occurs is considered, where context may refer, for example, to a file, class, function, or line of code.

At 710, the compiler identifies portions of a bigram that at least partially match the pattern selected at 708. As described herein, for example in relation to FIG. 4, the compiler locates bigrams that match at least a portion of the pattern, e.g., by containing the initial element of the bigram, but not the subsequent element, or vice versa. Since each bigram is associated with a portion of source code, this step results in the compiler identifying which portions of the source code might contain a potential error.

At 712, the system further analyzes the deviations from the pattern in the identified portions of source code. In some cases and embodiments, this analysis may be omitted, or may simply comprise gathering information about the suspect of source code, in order to generate an error message at 714. In other cases and embodiments, the compiler may perform more complex analysis to winnow out cases where the suspected region does not, in fact, contain an error. For example, in at least one embodiment, the compiler performs a more complex sequence analysis based on patterns identified in an around the suspect portion.

At 714, the system generates an error message to indicate the suspected portion. The error message, in at least one embodiment, contains a file name and line number(s) that pinpoint the location of the suspected error. The error message may further contain text describing the basis for suspecting that portion of source code, such as the bigram or a sample of code that conforms to the expected pattern.

Figure 8:
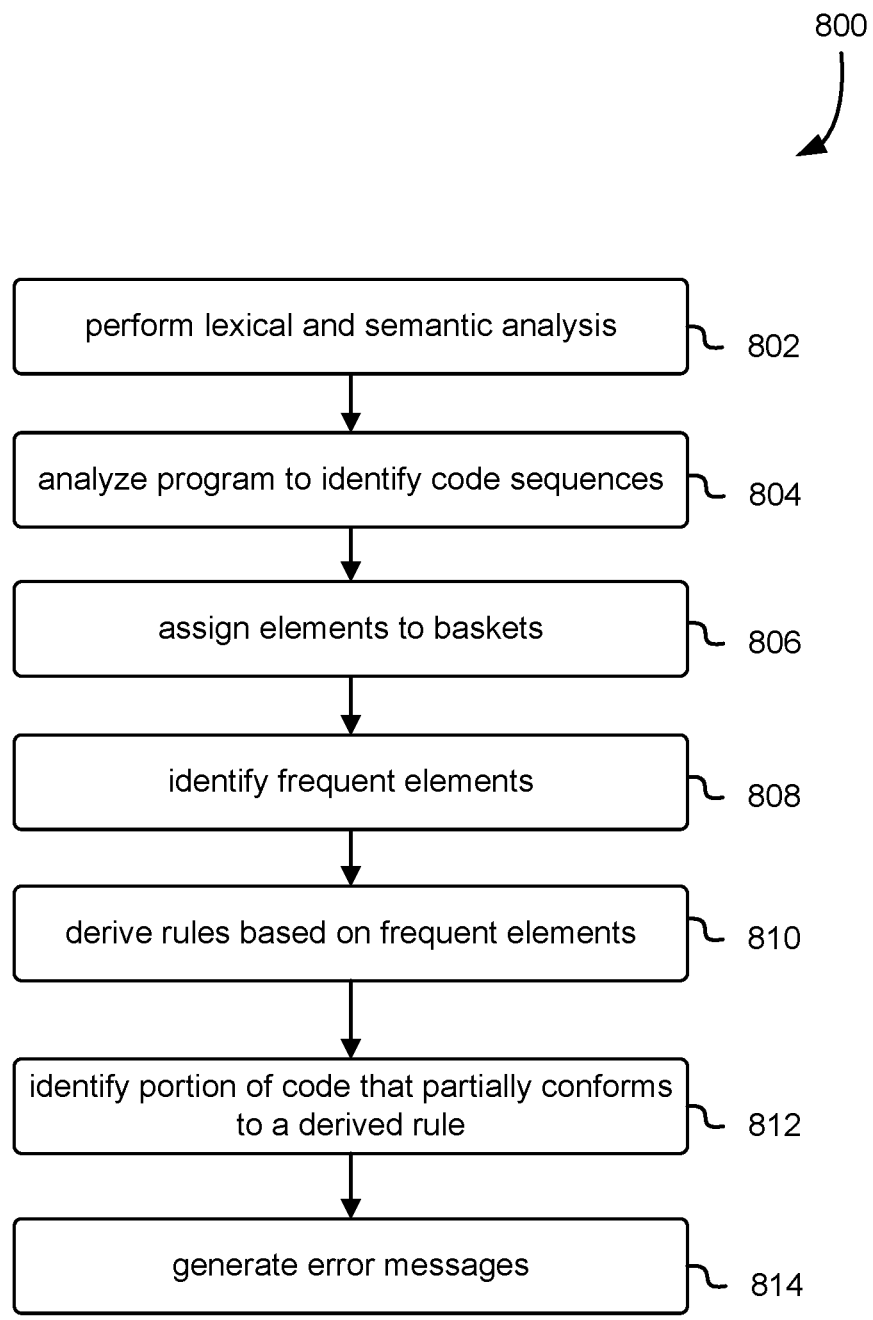
FIG. 8 illustrates an example process of identifying program errors using sequence-based frequency analysis, in accordance with at least one embodiment.

FIG. 8 illustrates an example process of identifying program errors using sequence-based frequency analysis, in accordance with at least one embodiment. Although the example process 800 is depicted as a sequence of steps or operations, it will be appreciated that the depicted order is intended to be illustrative rather than limiting. In various embodiments, the depicted steps or operations may be altered, omitted, or reordered, except where explicitly indicated or logically required, such as when the input of a step or operation is dependent upon the output of a prior step or operation. Embodiments of the example process may be implemented by any suitable system, such as a computing device or hosted computing service. In addition, although the steps below are described as being implemented by a compiler, it will be appreciated that a compiler is but one of many possible embodiments, and that the description of example process 800 using a compiler embodiment is intended to be illustrative, rather than limiting.

At 802, the compiler performs lexical and semantic analysis of a collection of source code. This step may be similar to, the same as, or coterminous with the lexical and semantic analysis performed at step 702 as described in relation to FIG. 7. Embodiments may, for example, rely on the same output stages of the compiler to perform both bigram-based and sequence-based analysis of the source code.

At 804, the compiler analyzes the program to identify code sequences. Here, a code sequences refers to a plurality of related units of code. For example, the compiler might identify a sequence comprising the code units "F", "A", "B", "C", "D", corresponding to a portion of code that reads "f(A, B, C, D)". The compiler may, in some embodiments, store this sequence as a tree structure, a graph, or a list.

At 806, in at least one embodiment, the compiler assigns the elements identified in the prior step to baskets. This process, also described in relation to FIG. 5, involves assigning similar sequences to the same bucket, so that the frequency of these sequences in the code base can be analyzed. Exact or inexact matching may be used.

At 808, the compiler identifies frequently occurring sequences. These may be selected based on their potential to be indicative of patterns that reflect local best practices or other coding practices.

At 810, the compiler derives rules from the sequences identified at 808. In at least one embodiment, rules are identified using techniques frequent itemset mining, association rule learning, sequential pattern mining, or other similar techniques. In general terms, these approaches involve the use of the frequency distribution of sequences in the source code to derive a rule. In at least one embodiment, a rule may comprise information describing sequence. In some cases, the rule may indicate where deviations from this sequence are permitted, or conversely where deviations from the sequence are more likely to indicate a potential error.

At 812, the compiler identifies portions of code that partially conform to a derived rule. For example, if a rule indicates that invocations of the function "f" should generally take the form "f(A, B, C, D)", the compiler might identify a portion of code that reads "f(A, B, D)". In general, these portions of code may be found by scanning code units at an appropriate compiler output stage and comparing sequences from that stage to the indicated rule. If a portion of code fully conforms to a rule, it may be ignored, since it does not represent a likely source of error. However, if a portion of code generally conforms to a rule, but deviates in some way deemed significant, this deviation may indicate that the portion of code contains an error.

At 814, the compiler generates an error message. The error message can contain information identifying the location of the suspected error in the source code, as well as text describing the compiler's basis for suspecting that portion of source code. This could include a description of the rule that was applied and a description of how the suspected portion of source code deviates from that rule.

Figure 9:
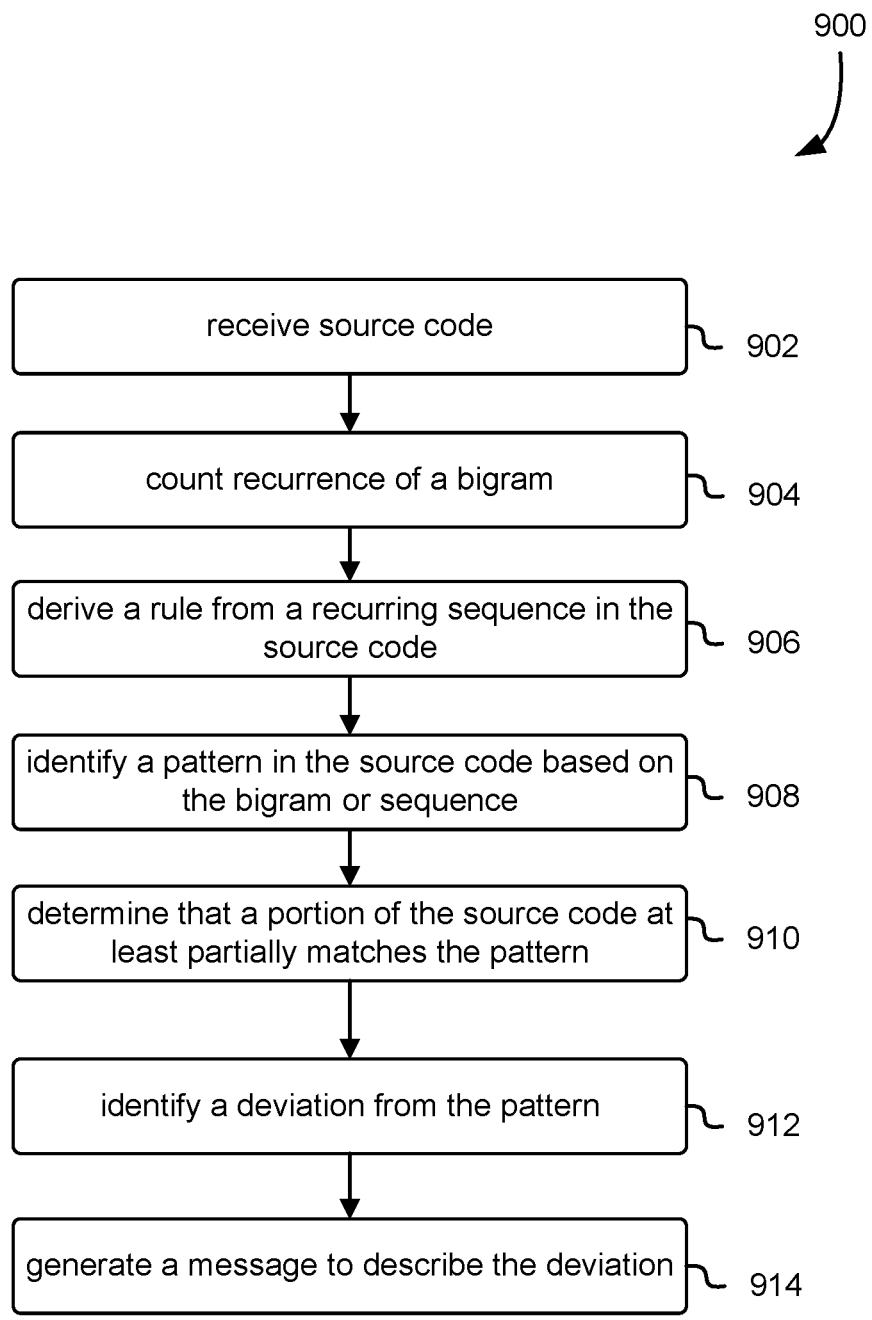
FIG. 9 illustrates an example process of identifying programming errors, in accordance with at least one embodiment.

FIG. 9 illustrates an example process of identifying programming errors, in accordance with at least one embodiment. Although the example process 900 is depicted as a sequence of steps or operations, it will be appreciated that the depicted order is intended to be illustrative rather than limiting. In various embodiments, the depicted steps or operations may be altered, omitted, or reordered, except where explicitly indicated or logically required, such as when the input of a step or operation is dependent upon the output of a prior step or operation. Embodiments of the example process may be implemented by any suitable system, such as a computing device or hosted computing service. In addition, although the steps below are described as being implemented by a compiler, it will be appreciated that a compiler is but one of many possible embodiments, and that the description of example process 900 using a compiler embodiment is intended to be illustrative, rather than limiting.

At 902, the compiler receives source code. Examples of source code are depicted and described in relation to FIG. 1. In cases and embodiments, the source code is provided in units which demarcate the local boundaries within which patterns should be derived. By being provided with code files belonging to a particular subsystem, and by separately analyzing these files, the compiler can identify patterns that are particular to the particular subsystem, and generate error messages and notifications when those local patterns are violated.

At 904, the compiler counts the recurrence of a bigram, as a part of the bigram-based analysis techniques described herein. Examples of this analysis are provided herein, for example with respect to FIGS. 2, 4, and 7.

At 906, the compiler derives a rule from a recurring sequence in the source code. This relates to the sequence-based analysis described herein, for example with respect to FIGS. 5, 6, and 8.

At 908, the compiler identifies a pattern based on the bigram or sequence-based analyses described in the preceding steps. As described herein, embodiments may rank or prioritize the patterns identified through bigram or sequence-based analysis, in order to better focus on those patterns which, if violated, are most likely to indicate a defect in the code. For example, the compiler might prioritize patterns derived from the most frequently occurring bigrams or sequences, over those patterns derived from less frequent bigrams or sequences.

At 910, the compiler determines that a portion of the source code at least partially matches the pattern. Code that does not at least partially match the identified pattern is, most likely, irrelevant to the pattern and not indicative of a defect. However, portions of the source code that partially match the pattern, but deviate in some way, may be indicative of a defect.

At 912, the compiler identifies this deviation in the portion of source code. As described herein, for example in relation to FIGS. 4 and 6, the deviation may comprise missing or replaced elements of the code. In the case of a bigram, the source code might contain one of the two code units that make up the bigram, but this code unit would not be followed or proceeded by the other component of the bigram. For sequences, a code unit might be missing or substituted in the partially matching portion of code.

At 914, the system generates a message to describe the identified deviation. In at least one embodiment, this include a location in the source code and text which describes the pattern that was violated.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including the identification of software defects that are difficult to detect by other means.

Figure 10:
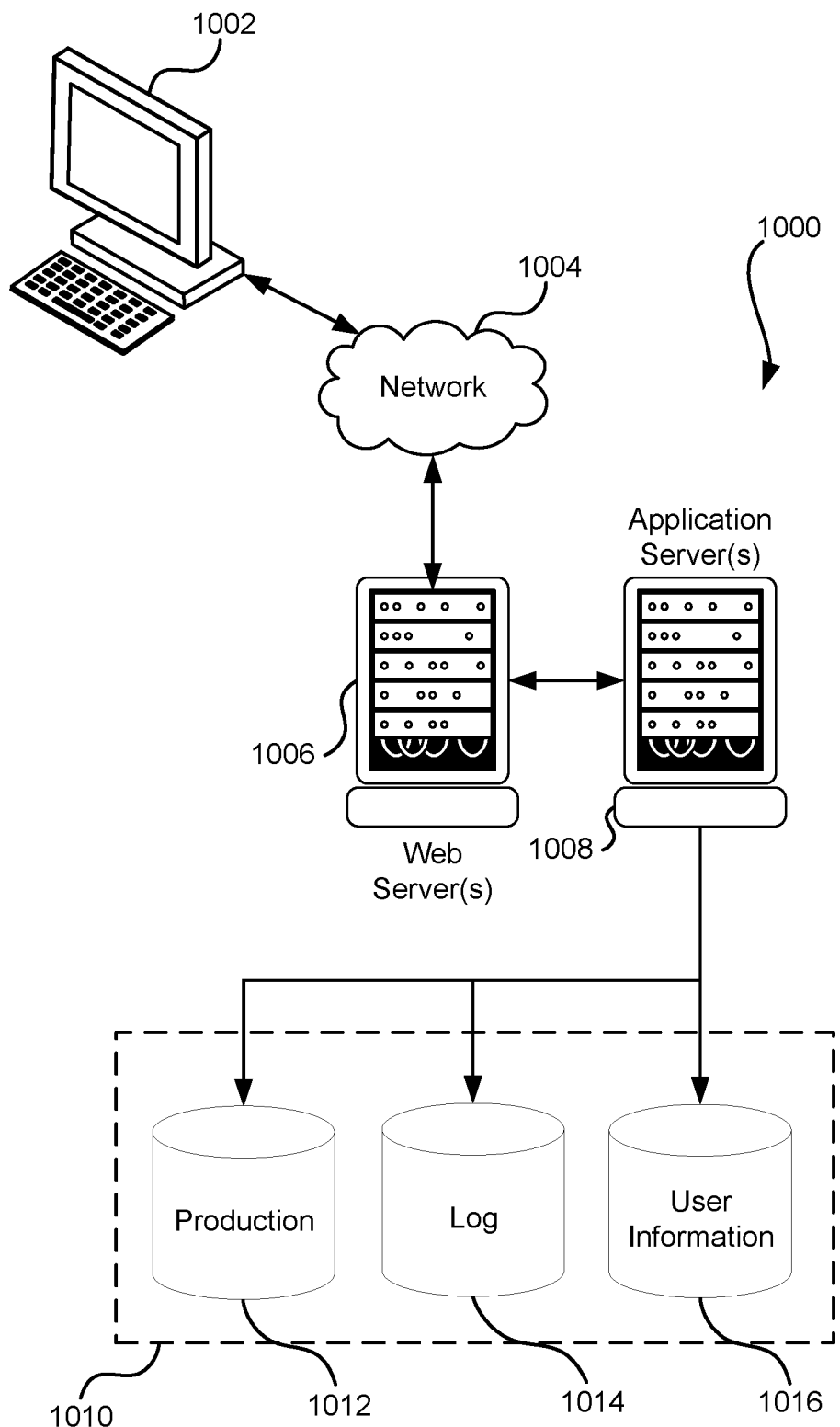
FIG. 10 illustrates a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular, or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network, or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes at least one application server 1008 and a data store 1010, and it should be understood that there can be several application servers, layers or other elements, processes, or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered system. Data stores, in an embodiment, communicate with block-level and/or object-level interfaces. The application server can include any appropriate hardware, software, and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually, and/or through other senses. The handling of all requests and responses, as well as the delivery of content between the client device 1002 and the application server 1008, in an embodiment, is handled by the web server using PUP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes, and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, computing resource management, analysis, or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update, or otherwise process data in response thereto, and the application server 1008 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1002. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

Embodiments of the present disclosure may be further understood in view of the following clauses:

1. A system, comprising:
   one or more processors; and
   memory storing instructions that, in response to execution by the one or more processors, cause the system to at least:
      identify a pattern in source code, the pattern identified based at least in part on at least one of recurrence of a bigram in the source code or a rule derived from a sequence in the source code;
      determine that a portion of the source code at least partially matches the pattern;
      determine that the portion of the source code deviates from the pattern; and
      generate an error message indicative of the deviation.

2. The system of clause 1, wherein the bigram comprises a first unit of code and a second unit of code, wherein the first unit of code is sequential with the second unit of code.

3. The system of clauses 1 or 2, wherein the pattern indicates that a first unit of code should be followed, in the source code, by a second unit of code, wherein the first and second units of code are components of the bigram.

4. The system of any of clauses 1-3, wherein the rule is derived by at least determining a frequency distribution of a plurality of sequences of code units obtained from a compiler stage.

5. A computer-implemented method, comprising:
   identifying a pattern in source code, the pattern identified based, at least in part, on at least one of correlation between two or more units of code or a rule derived from a sequence in the source code;
   determining that a portion of source code matches a part of the pattern and also contains at least one deviation from the pattern; and
   generating a message to indicate the deviation.

6. The method of clause 5, wherein the correlation between the two or more units of code comprises a first unit of code followed by a second unit of code, the first and second units of code obtained from a compiler stage.

7. The method of clauses 5 or 6, further comprising:
   identifying the pattern based, at least in part, on a bigram comprising a first component corresponding to a first one of the two or more units of code and a second component corresponding to a second one of the two or more units of code; and
   determining that the portion of source code includes a first code unit that corresponds to the first component, but does not include a second code unit that corresponds to the second component.

8. The method of any of clauses 5-7, wherein the unit of code comprises a token.

9. The method of any of clauses 5-8, wherein the unit of code comprises a semantic element of a programming language.

10. The method of any of clauses 5-9, further comprising:
    determining a frequency distribution of a plurality of sequences in the source code; and
    deriving the rule based, at least in part, on the frequency distribution.

11. The method of any of clauses 5-10, further comprising:
    estimating a likelihood that the portion of source code includes an error based, at least in part, on a degree to which the portion of source code deviates from the pattern.

12. The method of any of clauses 5-11, wherein the pattern indicates an expected sequence of units of code, the units of code obtained from output of a compiler stage.

13. The method of any of clauses 5-12, wherein the message comprises information indicating a location in the source code estimated to contain an error.

14. A non-transitory computer-readable storage medium comprising executable instructions that, as a result of being executed by one or more processors of a computer system, cause the computer system to:
    identify a pattern in source code, the pattern, the pattern identified based, at least in part, on at least one of correlation two or more units of code or a rule obtained from a sequence in the source code;
    identify a portion of source code matches at least part of the pattern;
    determine that the portion of source code deviates from the pattern; and
    generate a message to indicate the deviation.

15. The non-transitory computer-readable storage medium of clause 14, wherein the executable instructions further comprise executable instructions that, as a result of being executed by the one or more processors, cause the computer system to:
    identify the pattern by determining that the correlation recurs with a frequency that is above a threshold amount.

16. The non-transitory computer-readable storage medium of clauses 14 or 15, wherein the executable instructions further comprise further executable instructions that, as a result of being executed by the one or more processors, cause the computer system to:
    store a bigram comprising an ordered sequence of the two or more units of code.

17. The non-transitory computer-readable storage medium of any of clauses 14-16, wherein the two or more units of code and elements of the sequence each comprise output from a compiler stage.

18. The non-transitory computer-readable storage medium of any of clauses 14-17, wherein the executable instructions further comprise executable instructions that, as a result of being executed by the one or more processors, cause the computer system to:
    determine a frequency distribution of one or more sequences, the one or more sequences comprising the sequence; and
    derive a rule based on the frequency distribution.

19. The non-transitory computer-readable storage medium of any of clauses 14-18, wherein the executable instructions further comprise executable instructions that, as a result of being executed by the one or more processors, cause the computer system to:
identify the pattern based at least in part on a frequency with which the sequence occurs in the source code.

20. The non-transitory computer-readable storage medium of any of clauses 14-19, wherein the executable instructions further comprise executable instructions that, as a result of being executed by the one or more processors, cause the computer system to:
generate the message to comprise a description of the pattern.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PUP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and nonremovable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
generating a plurality of code units corresponding to a plurality of portions of source code by at least one of a lexical analyzer and a semantic analyzer;
identifying one or more patterns in source code, wherein patterns of two code units are identified based, at least in part, on correlation between two units of code, and patterns of two or more code units are identified based, at least in part, on a rule derived from a recurring sequence in the source code;
determining that a portion of source code matches a part of a pattern and also contains at least one deviation from the pattern; and
generating a message to indicate the portion of the source code contains an error based on the deviation.

2. The method of claim 1, wherein the correlation between the two units of code comprises a first unit of code followed by a second unit of code, the first and second units of code obtained from a compiler stage.

3. The method of claim 1, further comprising:
identifying the patterns of two code units based, at least in part, on a bigram comprising a first component corresponding to a first one of the two units of code and a second component corresponding to a second one of the two units of code; and
determining that the portion of source code includes a first code unit that corresponds to the first component, but does not include a second code unit that corresponds to the second component.

4. The method of claim 1, wherein the unit of code comprises a token.

5. The method of claim 1, wherein the unit of code comprises a semantic element of a programming language.

6. The method of claim 1, further comprising:
determining a frequency distribution of a plurality of sequences in the source code; and
deriving the rule based, at least in part, on the frequency distribution.

7. The method of claim 1, further comprising:
estimating a likelihood that the portion of source code includes an error based, at least in part, on a degree to which the portion of source code deviates from the pattern.

8. The method of claim 1, wherein the pattern indicates an expected sequence of units of code, the units of code obtained from output of a compiler stage.

9. The method of claim 1, wherein the message comprises information indicating a location in the source code estimated to contain an error.

10. A system, comprising:
one or more processors; and
memory storing instructions that, in response to execution by the one or more processors, cause the system to at least:
generate a plurality of code units corresponding to a plurality of portions of source code by at least one of a lexical analyzer and a semantic analyzer;
identify one or more patterns in source code, wherein patterns of two code units are identified based at least in part on recurrence of a bigram in the source code, and patterns of two or more code units are identified based at least in part on a rule derived from a recurring sequence in the source code;
determine that a portion of the source code at least partially matches a pattern, and that the portion of the source code comprises a deviation from the pattern; and
generate, based at least in part on the deviation, an error message indicating the portion of the source code contains an error.

11. The system of claim 10, wherein the bigram comprises a first unit of code and a second unit of code, wherein the first unit of code is sequential with the second unit of code.

12. The system of claim 10, wherein the patterns of two code units indicate that a first unit of code should be followed, in the source code, by a second unit of code, wherein the first and second units of code are components of the bigram.

13. The system of claim 10, wherein the rule is derived by at least determining a frequency distribution of a plurality of sequences of code units obtained from a compiler stage.

14. A non-transitory computer-readable storage medium comprising executable instructions that, as a result of being executed by one or more processors of a computer system, cause the computer system to:
  generate a plurality of code units corresponding to a plurality of portions of source code by at least one of a lexical analyzer and a semantic analyzer;
  identify one or more patterns in source code, wherein patterns of two code units are identified based, at least in part, on recurrence of a bigram in the source code of the two code units, and patterns of two or more code units are identified based, at least in part, on a rule obtained from a sequence in the source code determined to be recurring;
  identify a portion of source code matches at least part of a pattern but comprises at least one deviation from the pattern;
  and generate, based at least in part on the at least one deviation, a message to indicate that the portion of the source code contains an error.

15. The non-transitory computer-readable storage medium of claim 14, wherein the executable instructions further comprise executable instructions that, as a result of being executed by the one or more processors, cause the computer system to:
  identify the patterns of the two code units by determining that the bigram recurs with a frequency that is above a threshold amount.

16. The non-transitory computer-readable storage medium of claim 14, wherein the executable instructions further comprise further executable instructions that, as a result of being executed by the one or more processors, cause the computer system to:
  store a bigram comprising an ordered sequence of the two units of code.

17. The non-transitory computer-readable storage medium of claim 14, wherein the two code units and elements of the sequence each comprise output from a compiler stage.

18. The non-transitory computer-readable storage medium of claim 14, wherein the executable instructions further comprise executable instructions that, as a result of being executed by the one or more processors, cause the computer system to:
  determine a frequency distribution of one or more sequences, the one or more sequences comprising the sequence; and
  derive a rule based on the frequency distribution.

19. The non-transitory computer-readable storage medium of claim 14, wherein the executable instructions further comprise executable instructions that, as a result of being executed by the one or more processors, cause the computer system to:
  identify the patterns of two or more code units based at least in part on a frequency with which the sequence occurs in the source code.

20. The non-transitory computer-readable storage medium of claim 14, wherein the executable instructions further comprise executable instructions that, as a result of being executed by the one or more processors, cause the computer system to:
  generate the message to comprise a description of the one or more patterns.

\* \* \* \* \*